(12) United States Patent
Boulanger

(10) Patent No.: US 12,322,161 B2
(45) Date of Patent: Jun. 3, 2025

(54) CLOSED LOOP AUTOMATIC DATASET CREATION SYSTEMS AND METHODS

(71) Applicant: Teledyne FLIR Commercial Systems, Inc., Goleta, CA (US)

(72) Inventor: Pierre Boulanger, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 339 days.

(21) Appl. No.: 18/159,043

(22) Filed: Jan. 24, 2023

(65) Prior Publication Data
US 2023/0162488 A1    May 25, 2023

Related U.S. Application Data

(63) Continuation of application No. 17/146,459, filed on Jan. 11, 2021, now Pat. No. 11,568,178, which is a
(Continued)

(51) Int. Cl.
*G06V 10/774* (2022.01)
*G06F 18/21* (2023.01)
(Continued)

(52) U.S. Cl.
CPC .......... *G06V 10/774* (2022.01); *G06F 18/214* (2023.01); *G06F 18/217* (2023.01);
(Continued)

(58) Field of Classification Search
CPC .... G06V 10/774; G06V 10/776; G06V 10/82; G06F 18/214; G06F 18/217;
(Continued)

(56) References Cited

U.S. PATENT DOCUMENTS 10,235,601 B1    3/2019   Wrenninge et al.
10,382,799 B1 *  8/2019   Walters ............... G06F 16/2237
(Continued)

FOREIGN PATENT DOCUMENTS

CN    105938559 A    9/2016
CN    106651750 A    5/2017
(Continued)

OTHER PUBLICATIONS

Jones, "Whether patent application GB2020338.6 complies with section 14(3) and/or is excluded under section 1(2)(c)" Jan. 4, 2023 (Year: 2023).*
(Continued)

*Primary Examiner* — Juan A Torres
(74) *Attorney, Agent, or Firm* — Haynes and Boone, LLP

(57) ABSTRACT

Various techniques are provided for training a neural network to classify images. A convolutional neural network (CNN) is trained using training dataset comprising a plurality of synthetic images. The CNN training process tracks image-related metrics and other informative metrics as the training dataset is processed. The trained inference CNN may then be tested using a validation dataset of real images to generate performance results (e.g., whether a training image was properly or improperly labeled by the trained inference CNN). In one or more embodiments, a training dataset and analysis engine extracts and analyzes the informative metrics and performance results, generates parameters for a modified training dataset to improve CNN performance, and generates corresponding instructions to a synthetic image generator to generate a new training dataset. The process repeats in an iterative fashion to build a final training dataset for use in training an inference CNN.

20 Claims, 7 Drawing Sheets

Related U.S. Application Data continuation of application No. PCT/US2019/041087, filed on Jul. 9, 2019, application No. 18/159,043 is a continuation-in-part of application No. 17/127,684, filed on Dec. 18, 2020, now Pat. No. 11,948,355, which is a continuation of application No. PCT/US2019/037555, filed on Jun. 17, 2019.

(60) Provisional application No. 62/697,379, filed on Jul. 12, 2018, provisional application No. 62/686,627, filed on Jun. 18, 2018.

(51) Int. Cl.

| | |
|---|---|
| *G06F 18/214* | (2023.01) |
| *G06F 18/241* | (2023.01) |
| *G06N 3/04* | (2023.01) |
| *G06N 3/08* | (2023.01) |
| *G06V 10/776* | (2022.01) |
| *G06V 10/82* | (2022.01) |

(52) U.S. Cl.
CPC .............. *G06F 18/241* (2023.01); *G06N 3/04* (2013.01); *G06N 3/08* (2013.01); *G06V 10/776* (2022.01); *G06V 10/82* (2022.01)

(58) Field of Classification Search
CPC .......... G06F 18/241; G06N 3/04; G06N 3/08; G06N 3/0464; G06N 3/09
USPC ....................................................... 382/157
See application file for complete search history.

(56) References Cited

U.S. PATENT DOCUMENTS

| | | | | |
|---|---|---|---|---|
| 10,878,320 | B2* | 12/2020 | Wierzynski | G06V 10/454 |
| 11,151,447 | B1* | 10/2021 | Chen | G01S 7/4091 |
| 11,475,276 | B1* | 10/2022 | Shrivastava | G06N 3/094 |
| 2017/0032222 | A1 | 2/2017 | Sharma et al. | |
| 2017/0061625 | A1 | 3/2017 | Estrada et al. | |
| 2017/0301108 | A1 | 10/2017 | Estrada et al. | |
| 2017/0316281 | A1 | 11/2017 | Criminisi et al. | |
| 2018/0158210 | A1 | 6/2018 | Estrada et al. | |
| 2018/0232601 | A1* | 8/2018 | Feng | G06T 7/0004 |
| 2019/0130218 | A1 | 5/2019 | Albright et al. | |
| 2019/0251397 | A1* | 8/2019 | Tremblay | G06F 18/2148 |

FOREIGN PATENT DOCUMENTS

| | | |
|---|---|---|
| CN | 107492090 A | 12/2017 |
| CN | 107967463 A | 4/2018 |

OTHER PUBLICATIONS

Latger et al., "Simulation of active and passive infrared images using the Se-Workbench", Apr. 27, 2007, Proceedings SPIE 7513, 2009 International Conference On Optical Instruments And Technology, vol. 6543, p. 654302, XP055607381, 1000 20th St. Bellingham, WA 98225-6705 USA.

Omnivision Technologies et al., "Dual-Purpose RGB IR CameraChip (TM) Sensor Brings High Sensitivity and High Frame Rates to Mobile and Machine Vision Applications", Oct. 1, 2014, XP055607383, URL: https://www.ovt.com/download/sensorpdf/145/0mni Vision_ZZZ-E0L-0V4682.pdf [retrieved on Jul. 19, 2019].

Lemley et al., "Smart Augmentation—Learning an Optimal Data Augmentation Strategy", Mar. 24, 2017, arxiv.org, pp. 24, Ithaca, New York.

Kim et al., "Optimized Deep Convolutional Neural Network for Robust Automatic Ground Target Recognition", Jul. 21, 2017, IEEE Conference On Computer Vision And Pattern Recognition Workshops, IEEE, pp. 195-202, XP033145773.

Hou et al., "Unsupervised Histopathology Image Synthesis," Dec. 13, 2017, arxiv.org., Ithaca New York.

Wang et al., "Low-Shot Learning from Imaginary Data", Jun. 18, 2018, IEEE/CVF Conference on Computer Vision and Pattern Recognition, p. 21.

* cited by examiner

CLOSED LOOP AUTOMATIC DATASET CREATION SYSTEMS AND METHODS

CROSS-REFERENCE TO RELATED APPLICATIONS

This application is a continuation of U.S. patent application Ser. No. 17/146,459 filed Jan. 11, 2021 and entitled "CLOSED LOOP AUTOMATIC DATASET CREATION SYSTEMS AND METHODS," which is a continuation of International Patent Application No. PCT/US2019/041087 filed Jul. 9, 2019 and entitled "CLOSED LOOP AUTOMATIC DATASET CREATION SYSTEMS AND METHODS," which claims priority to U.S. Provisional Patent Application 62/697,379 filed Jul. 12, 2018 and entitled "CLOSED LOOP AUTOMATIC DATASET CREATION SYSTEMS AND METHODS," all of which are incorporated herein by reference in their entirety.

This application also is a continuation-in-part of U.S. patent application Ser. No. 17/127,684 filed Dec. 18, 2020 and entitled "SYNTHETIC INFRARED DATA FOR IMAGE CLASSIFICATION SYSTEMS AND METHODS," which is a continuation of International Patent Application No. PCT/US2019/037555 filed Jun. 17, 2019 and entitled "SYNTHETIC INFRARED DATA FOR IMAGE CLASSIFICATION SYSTEMS AND METHODS," which claims the benefit of U.S. Provisional Application No. 62/686,627 filed Jun. 18, 2018 and entitled "SYNTHETIC INFRARED DATA FOR IMAGE CLASSIFICATION SYSTEMS AND METHODS," all of which are hereby incorporated by reference in their entirety.

TECHNICAL FIELD

One or more embodiments of the present disclosure relate generally to image classification, and more particularly, for example, to systems and methods for training and/or validating a neural network for image classification.

BACKGROUND

In the field of image processing, there is an ongoing need for efficient and reliable ways to detect and classify objects of interest within a field of view (e.g., a scene) of an imaging device. In one approach, various images of an object of interest are collected into a training dataset for training a neural network to classify the object. The training images may be generated with a camera capturing images of the object at various angles and in various setting. A training dataset often includes thousands of images for each object classification, and can be time consuming, expensive and burdensome to produce. Some training images may be impractical to capture using a camera due to a risky location, an attempt to capture an image of a rare and unpredictable occurrence, or a large number of imaging scenarios that are needed. Further, training a neural network can be time consuming and processing intensive, taking several days or longer to work through a training dataset. As a result, such image classification neural networks may be difficult to adapt to new objects and environments and/or update with new training data. In view of the foregoing, there is a continued need for improved object detection and classification solutions that are easily adaptable to new use cases and that provide performance or other advantages over conventional systems.

SUMMARY

Various techniques are provided for training a neural network to classify images. In one or more embodiments, a convolutional neural network (CNN) is trained using training dataset comprising a plurality of synthetic images. The CNN training process tracks image-related metrics and other informative metrics as the training dataset is processed. The trained inference CNN may then be tested using a validation dataset of real images to generate performance results (e.g., whether the inference accurately classify objects of interest). In one or more embodiments, a training dataset and analysis engine extracts and analyzes the informative metrics and performance results, generates parameters for a modified training dataset to improve CNN performance, and generates corresponding instructions to a synthetic image generator to generate a new training dataset. The process repeats in an iterative fashion to build a final training dataset for use in training an inference CNN.

In one or more embodiments, synthetic imagery is generated to train a neural network (such as a CNN) for image classification. In one or more embodiments, an image classification system comprises a neural network trained on a synthetic training dataset, including synthetic images of objects rendered from a virtually represented imaging sensor in a virtual three-dimensional scene. In some embodiments, synthetic images include synthetic visible images and/or synthetic infrared images generated using infrared radiation signatures of virtual objects in the virtual three-dimensional scene and an infrared response model of the virtually represented infrared sensor. In one or more embodiments, a system for generating synthetic infrared training data comprises a three-dimensional scene modeling system operable to generate three-dimensional scenes comprising a plurality of objects, each object having an infrared radiation model, and an infrared sensor modeling system operable to model an imaging response for an infrared sensor virtually represented in the three-dimensional scene.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to image classification, and more particularly, for example, to systems and methods for training and validating a neural network for image classification. In one or more embodiments, synthetic images of a virtual three-dimensional environment are generated and used to train a neural network (such as a convolutional neural network (CNN)) for image classification. Performing video and/or image analytics using a CNN generally includes thousands of diverse training images to achieve an acceptable level of accuracy for many use environments, but capturing such imagery using a physical imaging device to image a real world scene can be very expensive. In accordance with various embodiments disclosed herein, a synthetic training dataset is generated to train a CNN, the training results are validated, and a training dataset analysis engine analyzes informative metrics and performance results to determine parameters for a new training dataset. The new parameters may be used to generate instructions for a synthetic image generator to update the training dataset to train an inference CNN with improved performance results.

Figure 1:
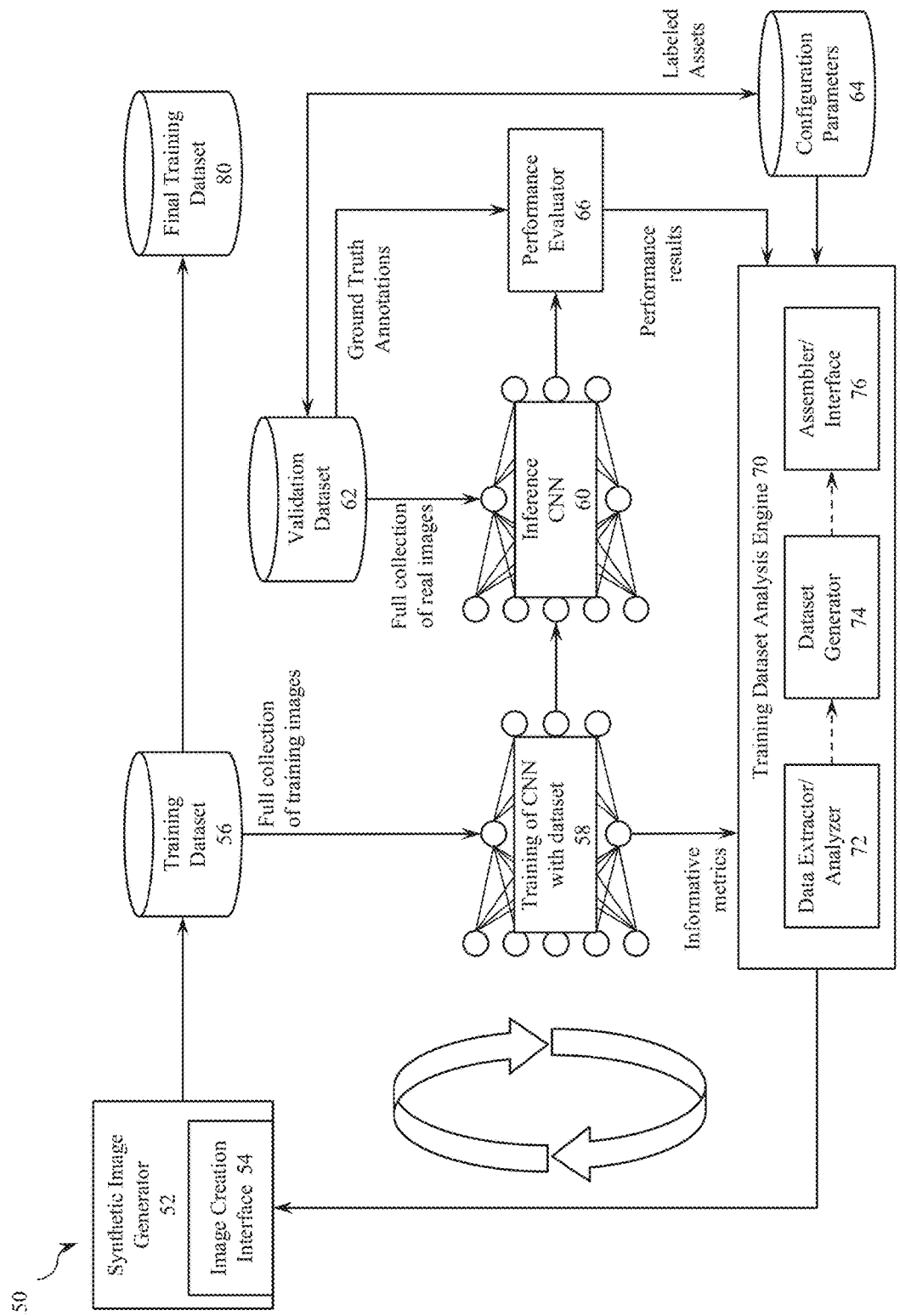
FIG. 1 illustrates a neural network training and validation system and process for a neural network, in accordance with various embodiments of the present disclosure.

Referring to FIG. 1, various embodiments of a system for training and validating a neural network will be described. In one or more embodiments, a system 50 generates a training dataset in an iterative process that yields high performance CNN object classification. The system 50 includes a synthetic image generator 52 (e.g., the environment simulation system 102 in FIG. 2) used to generate a training dataset 56 for training a neural network in a training process 58. The training process 58 works through the training dataset 56 to produce a trained inference CNN 60, and also generates image-specific data and other informative metrics during the training process. The trained inference CNN 60 is validated using a validation dataset 62 of labeled images to measure the performance of the inference CNN 60 as an image classifier.

In various embodiments, the validation dataset 62 includes a plurality of labeled, real world, images that are input to the trained inference CNN 60 and classified to measure of the performance of the trained inference CNN 60. The validation test images may include a variety of objects, object sizes and backgrounds representing real world use cases for the inference CNN 60. The real world images may be captured using any image capture device as appropriate including devices generating visible and/or infrared images. The performance results, including proper image labeling and image classification errors are provided to the training dataset analysis engine 70. The training dataset analysis engine 70 also receives image-specific data and other informative metrics compiled during the training process 58, and configuration parameters 64 that define a scope of use for the trained inference CNN 60. In one embodiment, a performance evaluator 66 receives the output of the inference CNN 60 and ground truth annotations from the validation dataset 62 to produce performance results data that is provided to the training dataset analysis engine 70.

The training dataset analysis engine 70 may then analyze the received data to modify the training dataset 56 by identifying images to keep (e.g., images that contribute to proper classification), drop from (e.g., images that do not contributed to proper classification) and/or add to the training dataset 56. In one or more embodiments, the training dataset analysis engine 70 receives the informative metrics and performance results, analyzes the available data in view of the configuration parameters, and instructs the synthetic image generator 52 to produce an updated training dataset 56 that is predicted to train an inference CNN with improved results.

In various embodiments, the training dataset analysis engine 70 includes a data extractor/analyzer 72, a dataset generator 74, and an assembler/interface 76. In one or more embodiments, the data extractor/analyzer 72 receives the informative metrics and performance results, extracts features for further processing, and analyzes the relative performance of one or more images from the training dataset 56. Metrics may include, for example, extracted features, data indicating changes in neural network parameters, data from previous iterations, and other data captured during training. In some embodiments, the extractor/analyzer 72 ranks the images from the training dataset 56 based on the performance results and/or the effect the image had on the training of the neural network. The dataset generator 74 uses the results of the data extractor/analyzer 72 and, in view of configuration parameters 64, generates parameters for a new training dataset 56 comprising a subset of the current training dataset 56 images and parameters defining new synthetic images to be generated for the next training dataset. The assembler/interface 76 converts the new training dataset parameters into instructions directing the image creation interface 54 to cause the synthetic image generator 52 to generate a new training data set 56. In some embodiments, the process continues iteratively until a final training dataset 80 that meets certain performance criteria, such as a percentage of correctly classified images during the validation process, performance for various size objects, cost validation and/or other criteria, is generated.

In various embodiments, the data extractor/analyzer 72 may extract informative metrics and/or performance results into various categories for further analysis, including compiling data based on different classification labels of the images from the training dataset, data based on performance/ underperformance, image characteristics (e.g., image size, object size, features extracted), and other groupings as may be appropriate. In one or more embodiments, the dataset generator 74 is one or more algorithms, neural networks, and/or other processes that receive the informative metrics and performance results and determines how to modify the training dataset to improve performance. The configuration parameters 64 define one or more goals of the classification CNN, such as parameters defining labels, objects, and environments to be used in the training dataset. For example, the configuration parameters 64 can be used to determine what assets the neural network should classify (e.g., people, bicycles, vehicles, roads, animals) and background environment in which the assets should appear (e.g., buildings, sky, trees).

In various embodiments, the synthetic image generator 52 may receive instructions to create a new training dataset 56, including an identification of current dataset images to maintain and which current images to delete. The synthetic image generator 52 may also receive instructions to generate new synthetic images in accordance with received parameters. In various embodiments, synthetic image generation may include random image generation, informed by configuration parameters 64 and an identification of desirable and undesirable parameters as defined by the dataset generator 74. For example, the inference CNN 60 may be trained to label certain objects (e.g., people, animals, vehicles), which may be presented in a variety of real world backgrounds, and the current training dataset may have produced unacceptable results classifying people in certain backgrounds. The synthetic image generator 52 may be instructed to create images of a certain object classification (e.g., people) by generating random versions of the object (e.g., men/women, young/old, different clothing, etc.) from random angles and distances, with a random background environments in accordance with the received parameters. In various embodiments, the synthetic image generator 52 is not constrained to producing images representing real world scenarios. Because a goal of the system is to train an inference CNN for classification, it is recognized that a synthetic image representing an unrealistic scenario (e.g., a flying pig) may be useful to training the CNN if it improves the results.

In some embodiments, the dataset generator 74 determines a subset of images from the training dataset 56 to maintain in the training dataset and defines new images to be generated. In some embodiments, images from the training dataset 56 may be ranked on performance results by ranking each image's impact based on overall performance. For example, the dataset generator 74 may keep a certain number of top ranked images for each image classification, keep images that contribute above an identified performance threshold, and/or keep a certain number of top ranked images overall. The dataset generation module 74 may also remove images from the training dataset 56 that are lowest ranked and/or contribute negatively or below an identified performance threshold. For example, the training dataset analysis engine 70 may ranked 1000 images, for example, and keep the best 100 images, remove the remaining 900 images. The new training dataset can include the previous 100 images and the newly generated 900 synthetic images which are selected to improve performance. Various parameters may represent a general categories for random scene generation including foreground object, size, type and angle; the position and type of the camera (e.g., visible camera, infrared imaging device); and presence of background assets.

It will be appreciated by those skilled in the art that creation of a synthetic training dataset and training a neural network is both time consuming and a processing intensive process, which can take days or weeks to perform. The processes described herein greatly reduce the time required to generate a training dataset and improve the performance of the resulting trained inference CNN.

Figure 2:
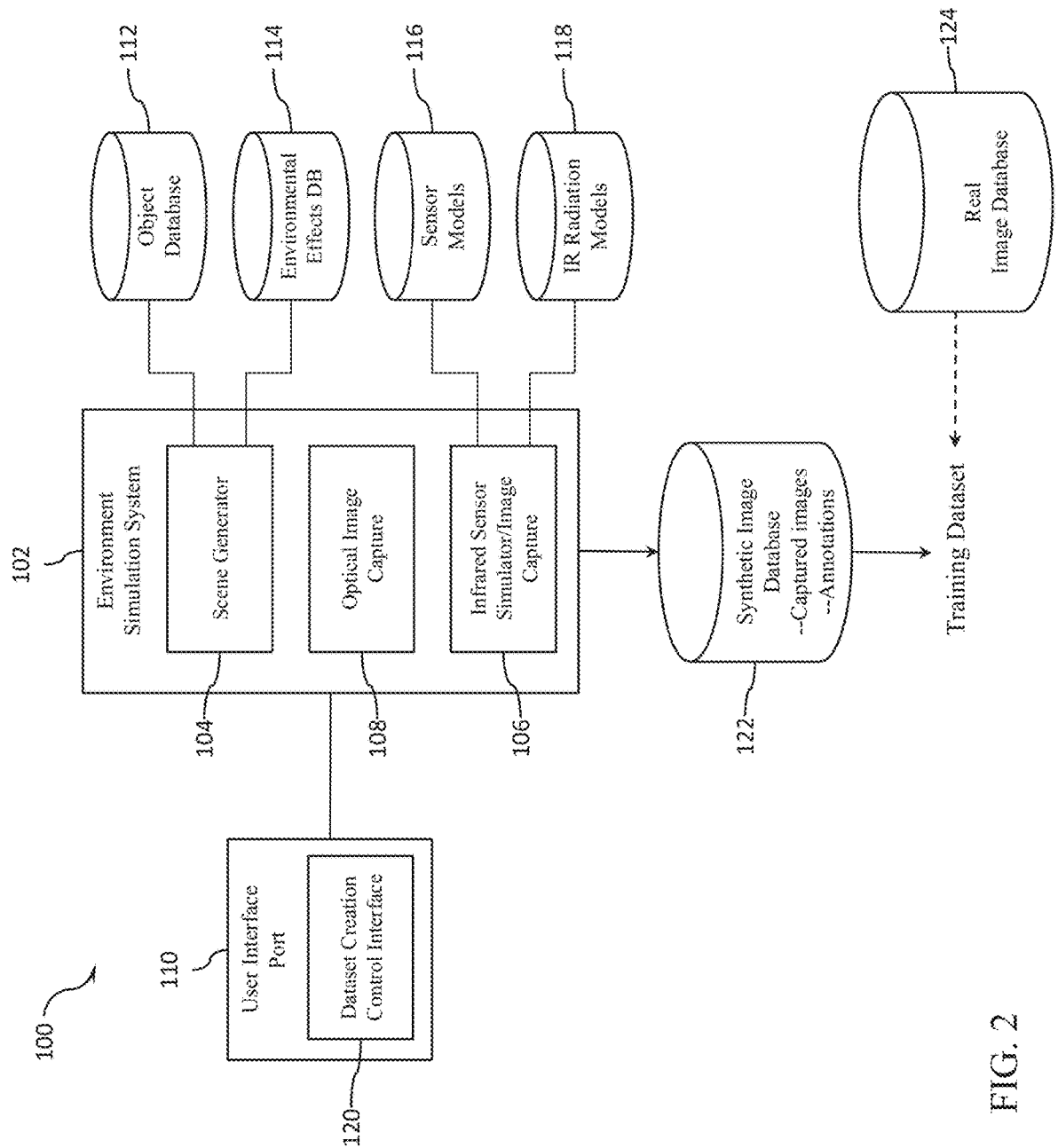
FIG. 2 illustrates an exemplary system for generating a set of synthetic image data for training an image classification system, in accordance with various embodiments of the present disclosure.

Referring to FIG. 2, embodiments of a synthetic imaging system 100 for generating a synthetic training dataset will be described. As illustrated, the synthetic imaging system 100 includes an environment simulation system 102 operable through a user interface port 110. In various embodiments, the environment simulation system 102 may include one or more computing devices operable to generate a three-dimensional (3D) environment simulating real world settings. The 3D environment may be constructed from a plurality of objects, including terrain, buildings, vehicles, people, animals and other objects that may appear in a captured image of a real world scene. In various embodiments, the synthetic imaging system 100 is configured to generate synthetic images that simulate images captured from a real image capture devices.

In various embodiments, the environment simulation system 102 includes a scene generator 104. The scene generator 104 is operable to build a virtual 3D environment utilizing data from an object database 112, which stores 3D models and other object data allowing a modeled 3D object to be placed in the scene. The scene generator 104 may also apply environmental effects 114 (such as weather conditions, temperature, time of day, etc.). The environment simulation system 102 may optionally include an infrared sensor simulator/image capture component 106 for capturing infrared images of a scene and/or an optical image capture component 108 for capturing visible images of a generated scene.

The infrared sensor simulator 106 is used to render a synthetic infrared image of the generated scene from the point of view of an infrared sensor. An infrared sensor model for each real world camera or imaging device is created and stored in the sensor models database 116 and may include sensor properties such as the wavelengths detected and pixel resolution of the physical device. In operation, a scene is created, environmental conditions are applied and a virtual infrared camera is positioned within the scene. The infrared radiation (e.g., heat) generated from the surface of each object in the scene is propagated to simulate real life heat transfer (e.g., by applying heat ray tracing from each surface), thermal signatures and other infrared radiation. In some embodiments, a motion factor may be applied to model infrared radiation as one or more objects move through the scene. A synthetic infrared image captures the infrared radiation in the scene from the position of the virtual infrared camera as modeled by an appropriate sensor model.

In various embodiments, infrared sensor models are created to approximate real world sensor response for a variety of infrared sensors, such as long wave, medium wave and short wave infrared sensors. The sensor models may also model active and passive infrared sensor systems, different wavelengths, such as near-infrared (e.g. night vision), and different physical detectors (e.g., microbolometers, quantum well, diode detectors). The infrared sensor simulator 106 can also combine infrared with any other modality (to cover both infrared and visible, for example). In some embodiments, noise is added to a subset of the synthetic infrared images to account for manufacturing tolerances and other variations affecting the operation of real world infrared sensors. For example, an embodiment may randomly apply one of ten types of noise to a subset of images to simulate a range of images captured from real world infrared cameras. Noise may also be added to account for other system and imaging variations, including non-realistic effects, to cause the system to learn to recognize objects regardless of its surroundings and obscurants.

In some embodiments, the optical image capture component 108 may be used to generate a synthetic visible light image of the scene. In embodiments that include the capture of both visible and infrared images, a synthetic visible light image may be stored with a synthetic infrared image for use in object classification. In other embodiments, the infrared sensor simulator 106 and optical image capture component 108 may operate to model a multi spectral dynamic imaging system (MSX) which generates a single combined image including a radiometric component of the captured synthetic infrared image and a blended component including infrared (e.g., thermal) characteristics of the scene blended with the visible light image.

In various embodiments, an object stored in the object database 112 includes a wire mesh model comprising a plurality of polygons, such as triangles. The wire mesh model includes a skin that reflects visible light, allowing the object to be visually represented in a three-dimensional scene. For infrared imaging, the infrared radiation models are applied to the three-dimensional objects in the scene. The infrared radiation models database 118 stores models for simulating the radiation transmitted from the three-dimensional objects, including fields associating objects with the infrared radiation models. In one or more embodiments, each triangular surface of an object is modeled using properties of the object's surface emissivity and/or expected temperature. For example, for each triangle, a model is created based on the emissivity of the particular skin, and the infrared radiation may be propagated in the scene through a ray tracing process from each triangular surface.

The properties of the object's skin on the three-dimensional wire mesh structure may be associated with real world infrared radiation models. A challenge is to create models for every object that may appear in a scene. One approach is to capture real world infrared images of each object to be modeled, however, this may be time consuming and expensive. In one embodiment, a three-dimensional object includes a surface skin having known texture and other properties, and the system applies an infrared radiation model generally associated with the surface skin and/or a general object classification. For example, an infrared radiation model for a mammal with fur may be applied to other mammals with similar fur characteristics. In one embodiment, a generalized model may be used for new objects. If feedback from a validation process indicates that the generalized model is not producing accurate image classification results, then a new model may be created or applied for the object to reduce the system error. The models may be updated as necessary to train a system for accurate image classification.

As described further herein, the embodiments of the present disclosure are scalable, allowing for creation of synthetic images that are accurate enough for image classification while optimizing performance within the constraints of a practical system. In one embodiment, object resolution (e.g., the size of the triangles) is scalable to optimize the operation of the environment simulation system 102 in view of time, processing, bandwidth and storage constraints. Many objects may be accurately modeled with a lower resolution (e.g., larger triangles and/or applying fewer rays traced per triangle), and complexity may be added as desired for accurate image classification. A building object, for example, may not require a model of the emissivity of every brick, provided enough features are modeled to allow the image classification system to properly detect or ignore the object. As another example, in many applications such as a system for identifying people, objects such as trees don't require a high degree of accuracy in modeling (e.g., don't need to model every leaf) and may be modeled at a lower complexity than other objects. By applying a range of complexity to the thermal modeling, an accurate and practical system may be created.

In operation, an operator accesses a user interface port 110 and establishes training parameters through a dataset creation control interface 120. Training parameters may include a location, environment, objects to be detected and other factors likely to appear in an image captured by an image capture device, such as a surveillance system. The dataset creation control interface 120 generates a series of images with a variety of locations, objects, angles, distances, and the images are stored in a synthetic image database 122 along with annotations for each image, including the object to be detected from the image and various scene, environmental data and dataset identifiers. The captured synthetic images may be compiled to produce a training dataset for use in training a neural network or other image classification system. In some embodiments, the training dataset may also include real images 124 captured with a camera, optical images captured by the optical image capture component 108, and other data as appropriate.

In various embodiments, it is desirable to have a training set comprising synthetic images of many different scenes. The environment simulation system 102 may be configured to create scenes using randomly created environments including randomness in the number and types of objects in the scene, location of objects, position of camera, and other factors affecting the scene to create a unique image. In some embodiments, non-realistic scenes, backgrounds and effects are imaged to expand the training dataset and create entropy.

The synthetic imaging system 100 may be embodied on one or more computing devices, servers and/or one or more databases, and may be combined with other components in an image classification system. Referring to FIG. 3A, various embodiments of an image classification system 200 will be described. The image classification system 200 may be implemented on one or more servers such as an application server that performs data processing and/or other software execution operations for generating, storing, classifying and retrieving images. In some embodiments, the components of the image classification system 200 may be distributed across a communications network, such as network 222. The communications network 222 may include one or more local networks such as a wireless local area network (WLAN), wide area networks such as the Internet, and other wired or wireless communications paths suitable for facilitating communications between components as described herein. The image classification system 200 includes communications components 214 operable to facilitate communications with one or more network devices 220 over the communications network 222.

In various embodiments, the image classification system 200 may operate as a general purpose image classification system, such as a cloud-based image classification system, or may be configured to operate in a dedicated system, such as a video surveillance system that stores video and images captured in real time from a plurality of image capture devices and identifies and classifies objects using a database 202. The image classification system 200 may be configured to receive one or more images (e.g., an image captured from infrared camera of a video surveillance system or a visible light image) from one or more network devices 220 and process associated object identification/classification requests.

As illustrated, the image classification system 200 includes one or more processors 204 that perform data processing and/or other software execution operations for the image classification system 200. The processor 204 may include logic devices, microcontrollers, processors, application specific integrated circuits (ASICs), field programmable gate arrays (FPGAs) or other devices that may be used by the image classification system 200 to execute appropriate instructions, such as software instructions stored in memory 206 including 3D simulation and image capture component 208, training dataset generation component 210, and image classification component 212 (e.g., a neural network trained by the training dataset), and/or other applications. The memory 206 may be implemented in one or more memory devices (e.g., memory components) that store executable instructions, data and information, including image data, video data, audio data, network information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein.

Each network device 220 may be implemented as a computing device such as a desktop computer or network server, a mobile computing device such as a mobile phone, tablet, laptop computer or other computing device having communications circuitry (e.g., wireless communications circuitry or wired communications circuitry) for connecting with other devices in image classification system 200. In various embodiments, the network device 220 may include an imaging device or a component of a video surveillance system.

The communications components 214 may include circuitry for communicating with other devices using various communications protocols. In various embodiments, communications components 214 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 214 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 214.

Figure 3B:
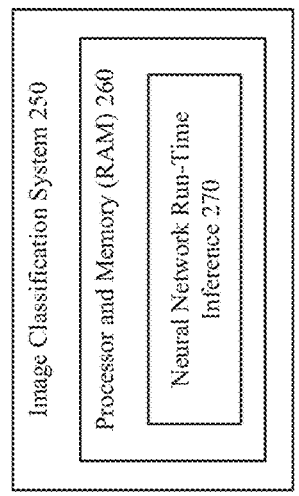
FIGS. 3A-B illustrate exemplary image classification systems trained using synthetic image data, in accordance with various embodiments of the present disclosure.
Figure 3A:
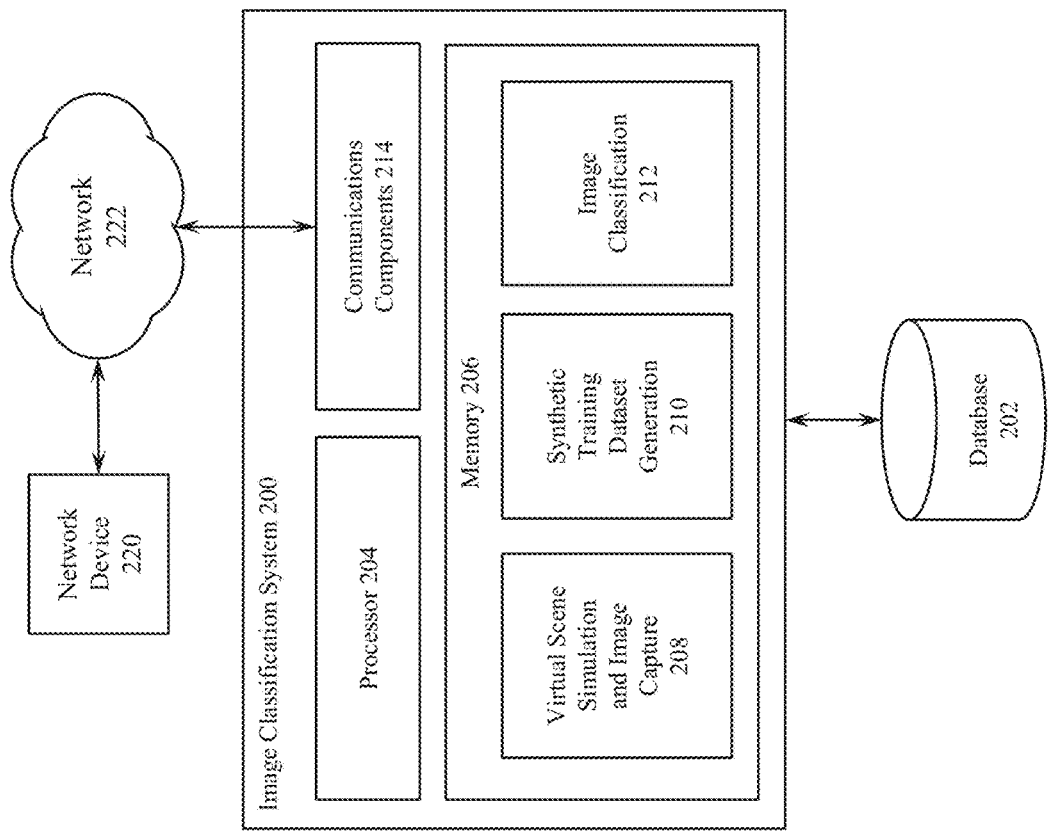

In various embodiments, a trained image classification system may be implemented in a real-time environment, as illustrated in FIG. 3B. The image classification system 250 may include a thermal imaging camera or other device or system operable to receive and/or generate thermal images. In the illustrated embodiment, the image classification system 250 includes a processor and memory 260, operable to store a trained neural network and implement a neural network run-time interface 270 thereon.

Figure 4A:
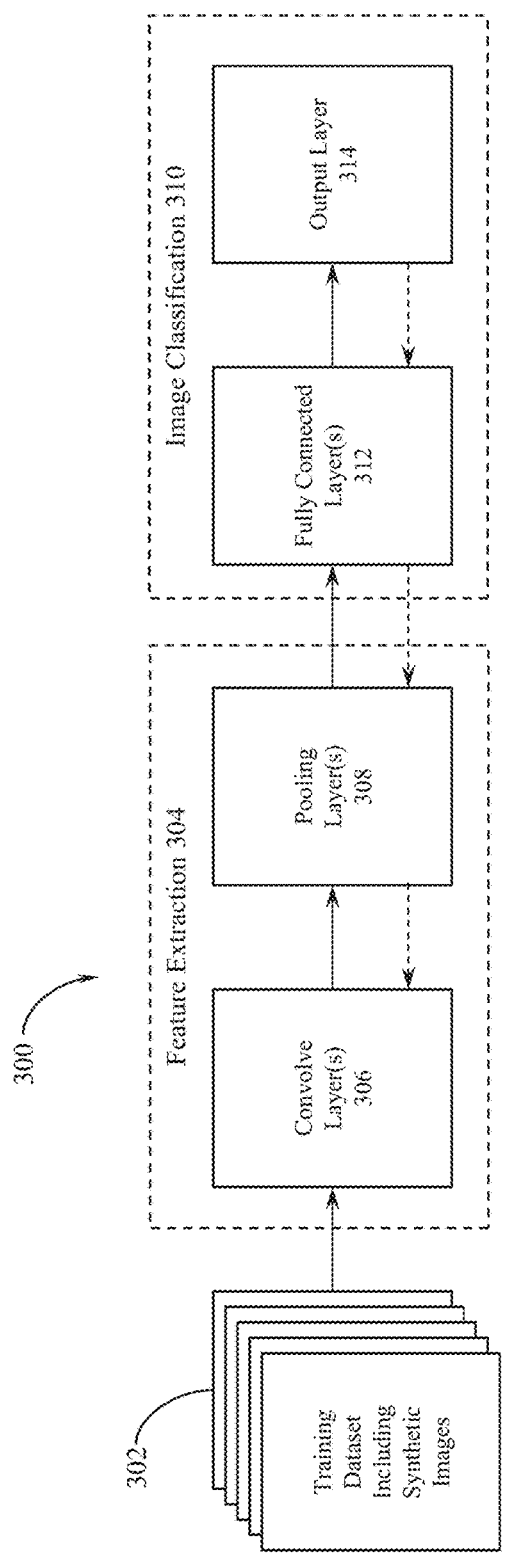
FIG. 4A illustrates a neural network training process using synthetic images, in accordance with various embodiments of the present disclosure.

In various embodiments, the synthetic training dataset disclosed herein may be used to train a neural network or other classification system for object classification. Referring to FIG. 4A, an embodiment of a neural network utilizing synthetic training data will now be described. In one embodiment, the neural network 300 is a convolutional neural network (CNN) that receives the training dataset 302 and outputs a classification for each image. The training dataset includes synthetic images as described herein, and may also include real images captured from an infrared, visible light, or other type of camera. For object classification, the images may comprise a region of interest from a captured image that includes an object to be identified. In one embodiment, the training starts with a forward pass through the neural network 300 including feature extraction 304 in a plurality of convolution layers 306 and pooling layers 308, followed by image classification 310 in a plurality of fully connected layers 312 and an output layer 314. Next, a backward pass through the neural network 300 may be used to update the CNN parameters in view of errors produced in the forward pass (e.g., misclassified objects). In various embodiments, other neural network processes may be used in accordance with the present disclosure.

Figure 4B:
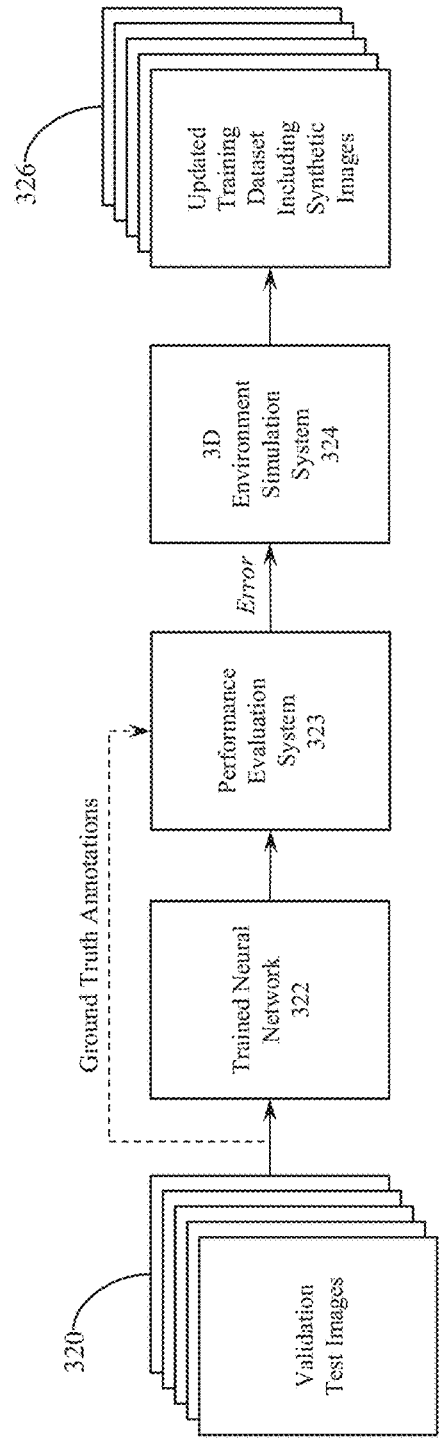
FIG. 4B illustrates a validation process for the neural network of FIG. 4A, in accordance with various embodiments of the present disclosure.

An embodiment for validating the trained neural network is illustrated in FIG. 4B. A set of fully annotated validation test images 320 representing real world images is fed into the trained neural network 322. The validation test images 320 include a variety of objects, object sizes and backgrounds to classify. A performance evaluation system 323 detects and analyzes errors (e.g., image classification vs. ground truth annotations) and feed the results back to the 3D environment simulation system 324 to update the synthetic model, which in turn updates the training dataset 326. In various embodiments, detected errors may be corrected by adding more examples an object (e.g., more types of clouds), increasing the resolution of the 3D model and/or increasing the accuracy of the thermal modeling, to help distinguish between objects in an image. By adjusting the synthetic training dataset to improve accuracy, the operator can avoid costly and time consuming efforts to collect needed real world images to update the training dataset.

Figure 4C:
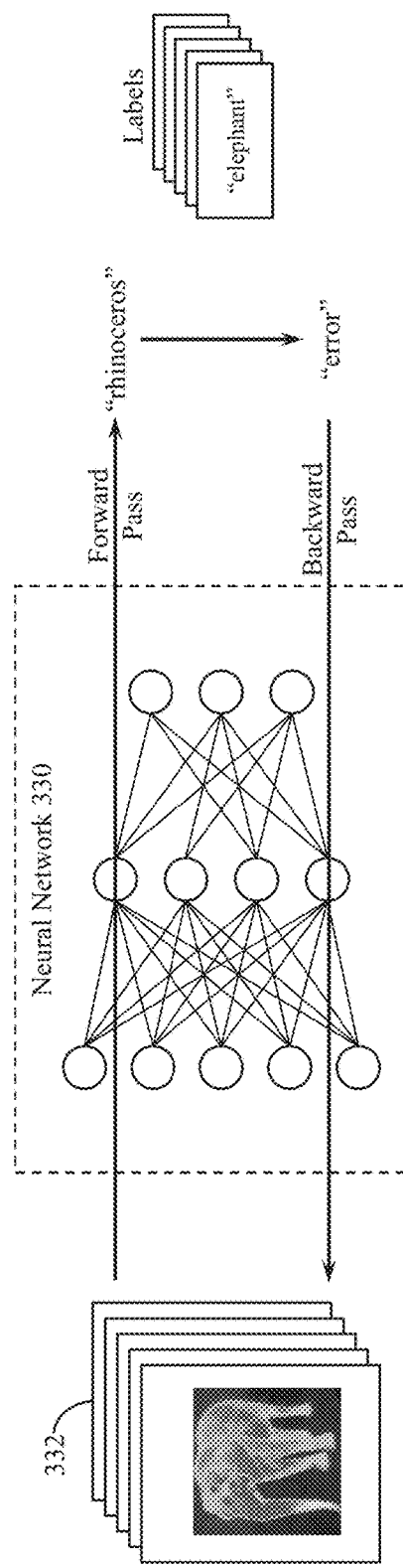
FIG. 4C illustrates a neural network training process using synthetic images, in accordance with various embodiments of the present disclosure.
Figure 4D:
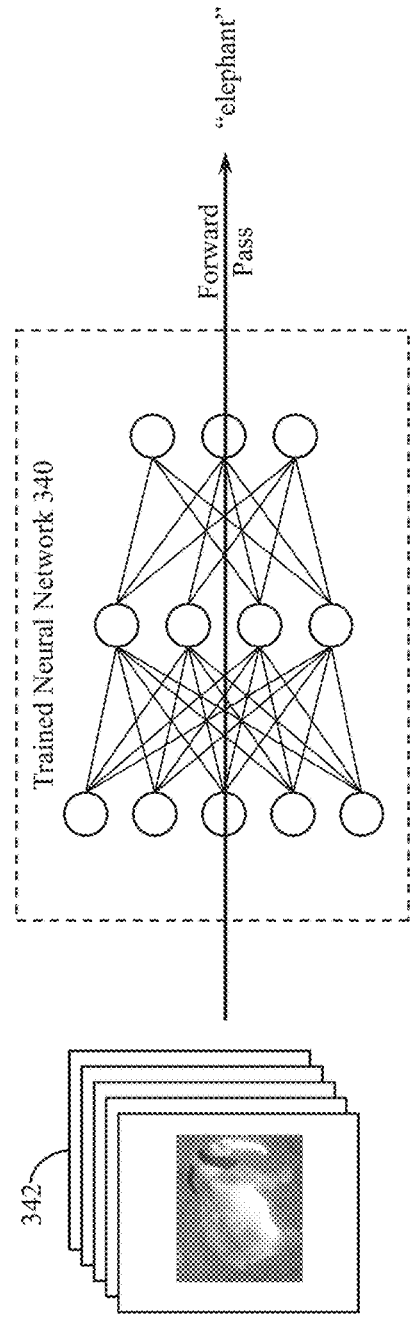
FIG. 4D illustrates an operation of the trained neural network of FIG. 4C, in accordance with various embodiments of the present disclosure.

Referring to FIG. 4C, further details of an embodiment for training a neural network utilizing synthetic training data will now be described. A neural network 320, such as a convolutional neural network, is trained using a training dataset 332 that includes synthetic images as described herein. The training includes with a forward pass through the neural network 330 to produce an image classification. In the illustrated embodiment, a thermal image such as a synthetic thermal image of an elephant is fed to the neural network 330 to produce a classification at the output layer. Each synthetic image is labeled with the correct classification and the output of the neural network 330 is compared to the correct label. If the neural network 330 mislabels the input image (e.g., determines that the image is a "rhinoceros" instead of an "elephant"), then a backward pass through the neural network 330 may be used to adjust the neural network to correct for the misclassification. Referring to FIG. 4D, a trained neural network 340, may then be implemented in an application (i.e., a neural network inference application) on a run time environment to classify thermal images 342.

Figure 5:
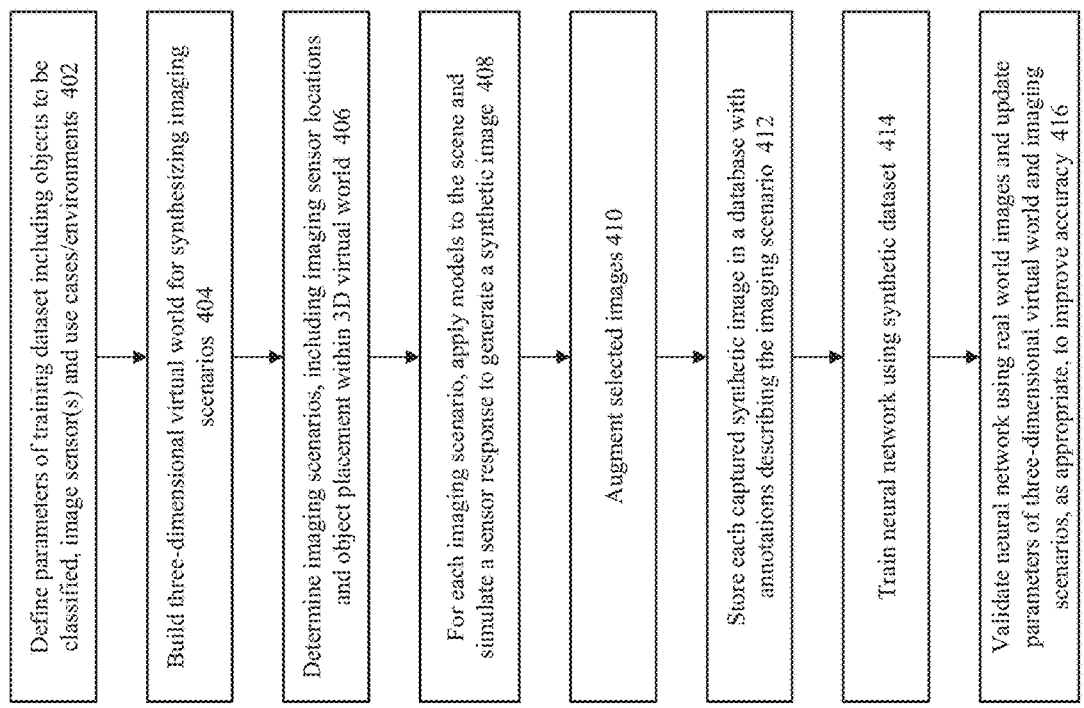
FIG. 5 illustrates an exemplary process for generating synthetic training data for object classification, in accordance with various embodiments of the present disclosure.

Referring to FIG. 5, embodiments of a process for generating training data for object detection in an image in will now be described. In step 402, an operator defines the parameters for the training dataset including an identification of the objects to be detected and classified, the imaging sensors to be modeled and use cases/environments in which images will be captured. In step 404, a three-dimensional virtual world is constructed to model the use case/environments. Next, imaging scenarios are constructed to fill out the training dataset, including imaging sensor locations and object orientation/location within the 3D virtual world, in step 406. For each imaging scenario, sensor models are applied and a simulated sensor response is generated in the form of a synthetic image, in step 408. In step 410, selected images are augmented to model various real world and/or non-realistic scenarios to train the neural network to classify objects in a variety of surroundings and obscurant conditions. For example, selected images may be augmented to add various types of noise, scale the images, flip the images, morph the images via style transfer techniques and other image augmentations.

In step 412, each captured synthetic image is stored in a training set database along with annotations describing the imaging scenario. In various embodiments, the annotations may identify objects in the image, object details, modeled sensor type, 3D environment, camera location and position, background objects/environment, time of day, weather and other information as appropriate to define the imaging scenario. In step 414, the synthetic training dataset is used to train a neural network. In step 416, the neural network is validated using real world images and the results are used to update the parameters of the virtual world and imaging scenarios to improve performance.

Figure 6:
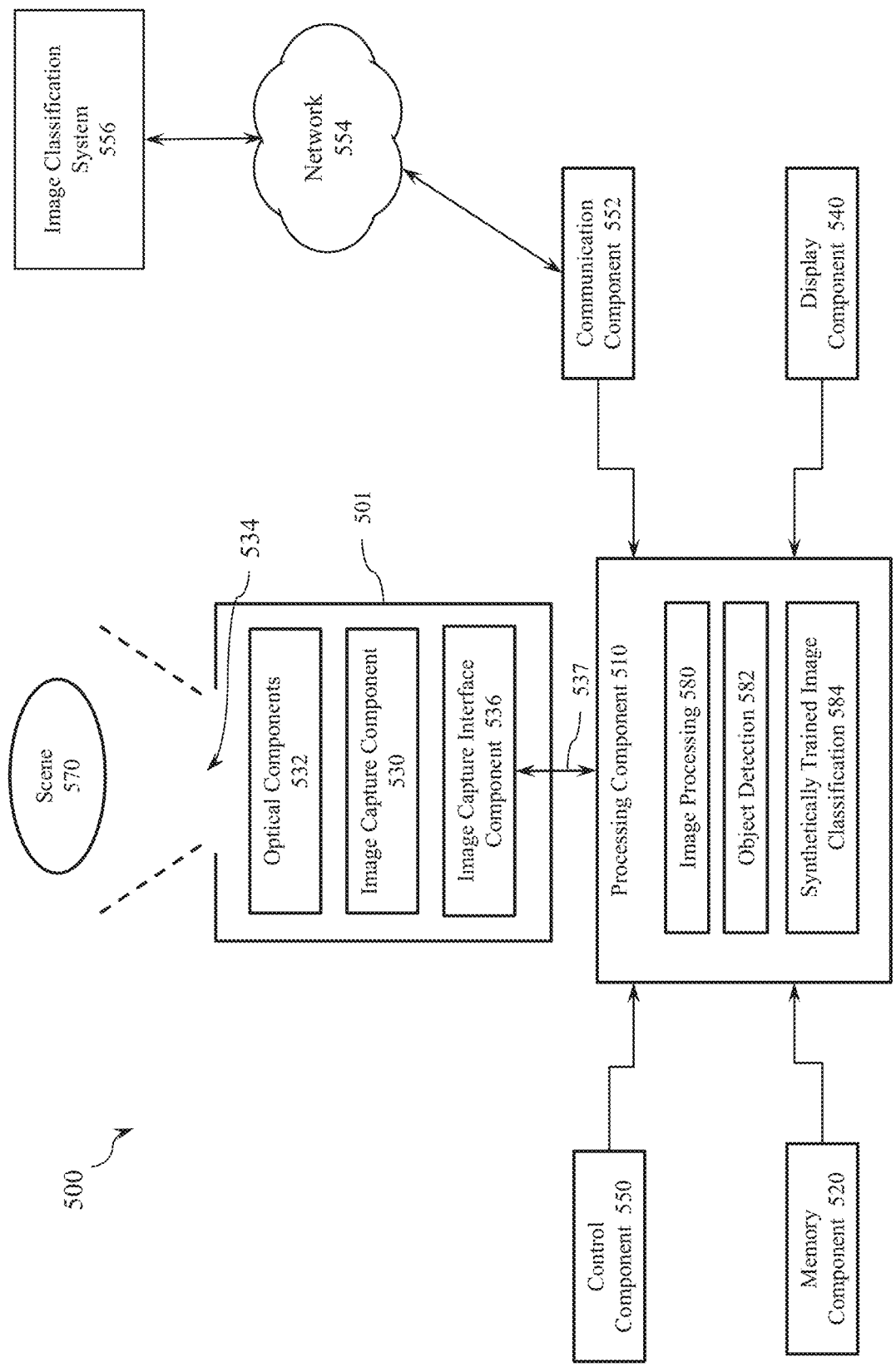
FIG. 6 illustrates an imaging system for use with an image classification system trained using synthetic image data, in accordance with various embodiments of the present disclosure.

Referring to FIG. 6, various embodiments of an imaging system will be described. The imaging system may be used to capture and process images to detect, classify and/or count objects that appear in a field of view. As illustrated, the imaging system 500 may be used for imaging a scene 570 in a field of view. The imaging system 500 includes a processing component 510, a memory component 520, an image capture component 530, optical components 532 (e.g., one or more lenses configured to receive electromagnetic radiation through an aperture 534 in camera component 501 and pass the electromagnetic radiation to image capture component 530), an image capture interface component 536, a display component 540, a control component 550, a communication component 552, and other sensing components.

In various embodiments, imaging system 500 may be implemented as an imaging device, such as camera component 501, to capture image frames, for example, of the scene 570 in the field of view of camera component 501. In some embodiments, camera component 501 may include image capture component 530, optical components 532, and image capture interface component 536 housed in a protective enclosure. Imaging system 500 may represent any type of camera system that is adapted to image the scene 570 and provide associated image data. Imaging system 500 may be implemented with camera component 501 at various types of fixed locations and environments (e.g., highway overpass to track traffic, as part of a premises surveillance system, to monitor/track people, etc.). In some embodiments, camera component 501 may be mounted in a stationary arrangement to capture successive images of a scene 570. Imaging system 500 may include a portable device and may be implemented, for example, as a handheld device and/or coupled, in other examples, to various types of vehicles (e.g., a land-based vehicle, a watercraft, an aircraft, a spacecraft, or other vehicle).

Processing component 510 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 510 is adapted to interface and communicate with components 520, 530, 540, and 550 to perform method and processing steps as described herein. Processing component 510 is also adapted to detect and classify objects in the images captured by the image capture component 530, through image processing module 580, object detection module 582, and synthetically trained image classification module 584.

It should be appreciated that processing operations and/or instructions may be integrated in software and/or hardware as part of processing component 510, or code (e.g., software or configuration data) which may be stored in memory component 520. Embodiments of processing operations and/or instructions disclosed herein may be stored by a machine readable medium in a non-transitory manner (e.g., a memory, a hard drive, a compact disk, a digital video disk, or a flash memory) to be executed by a computer (e.g., logic or processor-based system) to perform various methods disclosed herein.

Memory component 520 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 510 is adapted to execute software stored in memory component 520 and/or a machine-readable medium to perform various methods, processes, and operations in a manner as described herein.

Image capture component 530 includes, in one embodiment, one or more sensors for capturing image signals representative of an image, of scene 570. In one embodiment, the sensors of image capture component 530 provide for representing (e.g., converting) a captured infrared image signal of scene 570 as digital data (e.g., via an analog-to-digital converter included as part of the sensor or separate from the sensor as part of infrared imaging system 500). Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

Processing component 510 may be adapted to receive image signals from image capture component 530, process image signals (e.g., to provide processed image data), store image signals or image data in memory component 520, and/or retrieve stored image signals from memory component 520. In various aspects, processing component 510 may be remotely positioned, and processing component 510 may be adapted to remotely receive image signals from image capture component 530 via wired or wireless communication with image capture interface component 536, as described herein.

Display component 540 may include an image display device (e.g., a liquid crystal display (LCD)) or various other types of generally known video displays or monitors. Control component 550 may include, in various embodiments, a user input and/or interface device, such as a keyboard, a control panel unit, a graphical user interface, or other user input/output. Control component 550 may be adapted to be integrated as part of display component 540 to operate as both a user input device and a display device, such as, for example, a touch screen device adapted to receive input signals from a user touching different parts of the display screen.

Processing component 510 may be adapted to communicate with image capture interface component 536 (e.g., by receiving data and information from image capture component 530). Image capture interface component 536 may be configured to receive image signals (e.g., image frames) from image capture component 530 and communicate image signals to processing component 510 directly or through one or more wired or wireless communication components (e.g., represented by connection 537) in the manner of communication component 552 further described herein. Camera component 501 and processing component 510 may be positioned proximate to or remote from each other in various embodiments.

In one embodiment, communication component 552 may be implemented as a network interface component adapted for communication with a network including other devices in the network, and may include one or more wired or wireless communication components. In various embodiments, a network 554 may be implemented as a single network or a combination of multiple networks, and may include a wired or wireless network, including a wireless local area network, a wide area network, the Internet, a cloud network service, and/or other appropriate types of communication networks.

In various embodiments, imaging system 500 provides a capability, in real time, to detect, classify and count objects in the scene 570. For example, imaging system 500 may be configured to capture images of scene 570 using camera component 501 (e.g., an infrared camera). Captured images may be received by processing component 510 and stored in memory component 520. The image processing module 580 and object detection module 582 may extract from each of the captured images, a subset of pixel values of scene 570 corresponding to a detected object. The synthetically trained image classification module 584 classifies the detected object and stores the result in the memory component 520, an object database or other memory storage in accordance with system preferences. In some embodiments, imaging system 500 may send images or detected objects over network 554 (e.g., the Internet or the cloud) to a server system, such as image classification system 556, for remote image classification.

The object detection module 582 and synthetically trained image classification module 584 provide analysis of the captured images to detect and classify an object in a captured image. In various embodiments, the object detection module 582 interfaces with an object classification database, which stores information for analyzing and identifying digitized objects and other sensor information captured by an image capture device. For example, the database may store object classification criteria for generally identifying the class of a detected object (e.g., a person, an animal, a car, motorcycle, plant life, blowing objects, a shadow, etc.), reference images of known objects which may include synthetic images, field of view parameters for each image capture device (e.g., to for use in estimating object size), learned and configured activities common to each image capture device (e.g., false detections and classifications of objects may have been triggered by a nonstandard event), and other object classification information.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a training dataset comprising a plurality of labeled images, wherein the plurality of labeled images comprises a plurality of real-world images and a plurality of synthetic images and wherein each labeled image includes a label identifying a correct object classification for a corresponding image;
   a synthetic image generator operable to update the training dataset by generating a plurality of synthetic images of identified objects in virtual three-dimensional environments and corresponding labels identifying a correct classification for the identified objects in the corresponding synthetic images;
   a neural network training system operable to train a convolutional neural network for object detection using the plurality of labeled images from the training dataset and produce a trained convolutional neural network; and
   a training dataset analysis engine operable to analyze the trained neural network based at least in part on a validation process to generate parameters for an updated training dataset comprising an identification of a subset of the plurality of images to use in the updated training dataset based at least on part on objects correctly labeled during the validation process and parameters defining new synthetic images to be generated by the synthetic image generator based at least in part on objects with detected errors in classification;
   wherein parameters defining new synthetic images to be generated comprise an identification of objects to be detected and classified, imaging sensors to be modeled, and/or three-dimensional virtual environments in which the new synthetic images are to be captured.

2. The system of claim 1, wherein the neural network training system is further operable to generate informative metrics and/or performance results representing a contribution of the plurality of images to the neural network training system, the informative metrics and/or performance results comprising extracted features, classification labels, changes in neural network parameters, image characteristics and/or data from previous training dataset iterations; and
   wherein the training dataset analysis engine is operable to generate parameters for new training data in response to the informative metrics, the parameters for new training data including labels, objects, and/or environments to be used for images for the updated training dataset.

3. The system of claim 1, further comprising a validation system comprising a validation dataset comprising a plurality of labeled, real world images, wherein the trained neural network classifies images from the validation dataset and generates an error associated with an accuracy of image classification; and wherein the training dataset analysis engine is operable to generate parameters for new training data in response to errors in the image classification.

4. The system of claim 1, wherein the training dataset analysis engine comprises a data extractor/analyzer operable to receive informative metrics and performance results including extracted features, changes in neural network parameters and/or data from previous training dataset iterations and evaluate images based on a contribution to the neural network, wherein the contribution includes a ranking of the images based on the performance results.

5. The system of claim 1, wherein the training dataset analysis engine comprises a dataset generator operable to define the updated training dataset comprising a subset of the plurality of labeled images and parameters for a new synthetic images to be generated; and
wherein the training dataset and analysis engine comprises an assembler/interface operable to generate instructions for the synthetic image generator to create the updated training dataset.

6. The system of claim 1, further comprising configuration parameters defining a scope of an image classification system including labels, objects and/or environments to be used for labeled images in the training dataset.

7. The system of claim 1, wherein the training dataset analysis engine is further operable to rank each of the plurality of images based on a relative contribution to a performance of the neural network; and wherein the subset of the plurality of images comprises images having a rank above a threshold.

8. The system of claim 1, wherein the synthetic image generator is operable to receive the parameters defining new synthetic images, generate imaging scenarios including randomized object types and/or placement within a three-dimensional virtual environment; and
for each imaging scenario, generate a corresponding synthetic image for an updated training dataset.

9. The system of claim 1, wherein the updated training dataset comprises a subset of the plurality of labeled images.

10. The system of claim 1 wherein the system is further operable to train the convolutional neural network using the plurality of images, validate the trained convolutional neural network using real images to detect classification errors, and update the parameters in response to detected classification errors to improve classification accuracy.

11. A method comprising:
providing a training dataset comprising a plurality of labeled images, wherein the plurality of labeled images comprises a plurality of real-world images and a plurality of synthetic images and wherein each labeled image includes a label identifying a correct object classification for a corresponding image;
generating, via a synthetic image generator, a plurality of synthetic images of identified objects in virtual three-dimensional environments and corresponding labels identifying a correct classification for the object in the corresponding synthetic images;
training, via a neural network training system, a convolutional neural network for object detection using the plurality of labeled images from the training dataset to produce a trained convolutional neural network; and
generating, based on an analysis of the trained neural network via a training dataset analysis engine, parameters for an updated training dataset comprising an identification of a subset of the plurality of labeled images and parameters defining new synthetic images to be generated by the synthetic image generator based at least in part on objects with detected errors in classification;
wherein parameters defining new synthetic images to be generated comprise an identification of objects to be detected and classified, imaging sensors to be modeled, and/or three-dimensional virtual environments in which the new synthetic images are to be captured.

12. The method of claim 11, wherein training the convolutional neural network further comprises generating informative metrics representing a contribution of the plurality of images to the neural network training system, the informative metrics comprising extracted features, changes in neural network parameters, and/or data from previous training dataset iterations; and
wherein parameters for new training data is generated in response to the informative metrics, the parameters for the new training data comprising labels, objects, and/or environments to be used for images in the updated training dataset.

13. The method of claim 11, further comprising validating, using a validation dataset comprising a plurality of labeled, real world images, the trained neural network to detect image classification errors; and
wherein parameters for new training data is generated in response to the image classification errors.

14. The method of claim 11, further comprising receiving informative metrics and performance results including extracted features, changes in neural network parameters and/or data from previous training dataset iterations and evaluating images based on a contribution to the neural network, wherein the contribution includes a ranking of the images based on the performance results.

15. The method of claim 11, further comprising defining the updated training dataset comprising a subset of the plurality of labeled images and parameters for a new synthetic images to be generated; and
generating instructions for the synthetic image generator to create the updated training dataset.

16. The method of claim 11, further comprising determining configuration parameters defining a scope of a classification system, including labels, objects and/or environments to be used for labeled images in the training dataset.

17. The method of claim 11, further comprising ranking each of the plurality of images based on a relative contribution to a performance of the neural network; and wherein the subset of the plurality of images comprises the images having a rank above a threshold.

18. The method claim 11, further comprising receiving the parameters defining new synthetic images, generating imaging scenarios including randomized object types and/or placement within a three-dimensional virtual environment; and
generating, for each imaging scenario, a corresponding synthetic image for the updated training dataset.

19. The method of claim 11, further comprising generating the updated training dataset comprising a subset of the plurality of images.

20. The method of claim 11, further comprising training the convolutional neural network using the generated synthetic images, validating the training using real images to detect classification errors, and updating the parameters for the updated training dataset in response to detected classification errors to improve classification accuracy.

* * * * *

UNITED STATES PATENT AND TRADEMARK OFFICE
CERTIFICATE OF CORRECTION

Page 1 of 1

PATENT NO. : 12,322,161 B2
APPLICATION NO. : 18/159043
DATED : June 3, 2025
INVENTOR(S) : Pierre Boulanger It is certified that error appears in the above-identified patent and that said Letters Patent is hereby corrected as shown below:

In the Specification

Column 1, Lines 7-8, change "patent application Ser. No." to --Patent Application No.--.

Column 1, Lines 19-20, change "patent application Ser. No." to --Patent Application No.--.

Signed and Sealed this
Fifth Day of August, 2025

Coke Morgan Stewart
*Acting Director of the United States Patent and Trademark Office*